Nov. 19, 1946.   W. A. HICKS   2,411,372
PICTURE FRAME
Filed Sept. 11, 1944
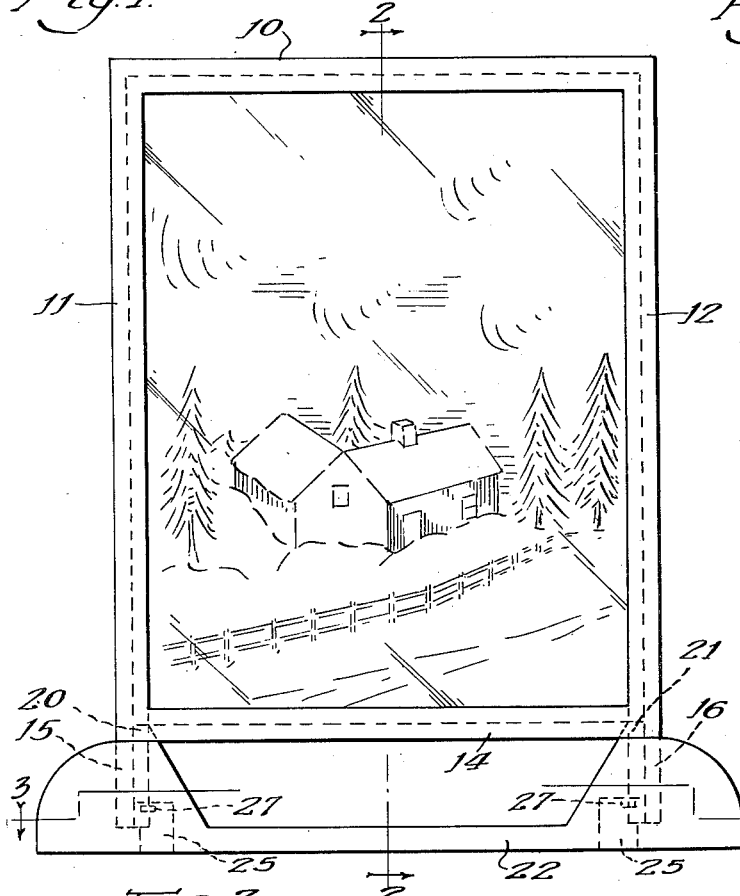
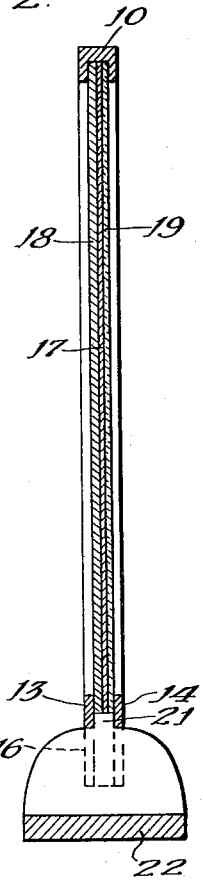
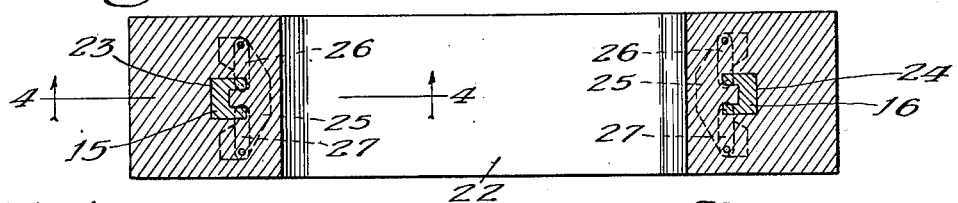
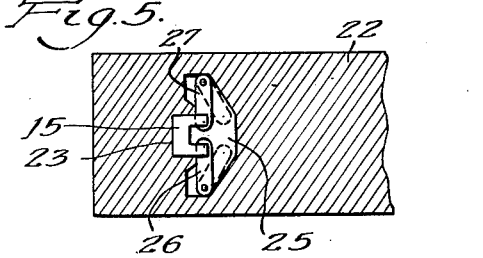
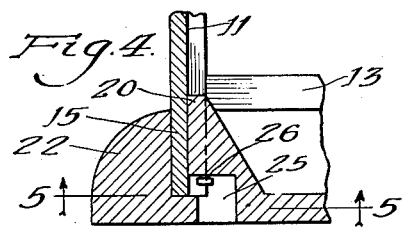
Inventor:
William A. Hicks
By: Zabel, Carlson, Fitzhaugh & Wells
Attorneys Patented Nov. 19, 1946

2,411,372

UNITED STATES PATENT OFFICE 2,411,372

PICTURE FRAME

William A. Hicks, Chicago, Ill.

Application September 11, 1944, Serial No. 553,552

2 Claims. (Cl. 40—152.1)

The present invention relates to frames for pictures, mirrors and the like. It is the principal purpose of this invention to provide a picture frame with a base so arranged that the picture or mirror, together with backing or covering material, can be inserted through one end of the frame before application of the frame to the base, and then locked in place by the mounting of the frame on the base.

It is a further purpose of this invention to provide a picture frame with a base so constructed that the two are easily separable to permit replacement of pictures in the frame; but the connection is as strong when made as either the frame or the base. I am aware that separable picture frames and bases have been made wherein the picture frame is slotted along one edge to allow the insertion of the picture or mirror, and that same edge is utilized to mount the frame upon a base. However, in any of such devices with which I am familiar, the mounting is of such a nature as to be weak and troublesome; likewise it does not take advantage of the side pieces of the frame to obtain the necessary mounting and rigidity. The features and advantages of my invention will appear more fully from the following description and the accompanying drawing wherein a preferred drawing of the invention is shown. It should be understood, however, that the drawing and description are illustrative only and are not to be taken as limiting the invention except insofar as it is limited by the claims.

In the drawing:

Figure 1 is a front view of a picture frame and base embodying my invention.

Figure 2 is a sectional view taken on the line 2—2 of Figure 1;

Figure 3 is a sectional view taken on the line 3—3 of Figure 2;

Figure 4 is a fragmentary sectional view taken on the line 4—4 of Figure 3; and

Figure 5 is a sectional view taken on the line 5—5 of Figure 4.

Referring now to the drawing, my improved picture frame construction comprises a top piece 10 which is of channel shape in cross section as shown best in Figure 2. Two side pieces 11 and 12 extend downwardly from the top piece. These side pieces are also channel shaped and are connected adjacent to the lower end by two spaced apart bars 13 and 14. The side pieces, however, extend beyond the bars 13 and 14 to provide mounting portions 15 and 16.

In order to place a picture in the frame, the picture, which is indicated by the numeral 17, and its backing sheet 18 and front glass cover 19, may be inserted together from the bottom of the frame along the channels of the side pieces 11 and 12 and between the bars 13 and 14. The picture, its backing and cover are secured in the frame by two projecting ribs 20 and 21 which are provided on a base 22 that mounts the frame. The ribs 20 and 21 are of such size and shape as to fit snugly between the bars 13 and 14. The extensions 15 and 16 of the side frames extend down through channel shaped openings 23 and 24 that are provided in the opposite ends of the base 22. These openings extend all the way through the base, which are peculiarly formed as shown in the drawing so as to provide means for locking the extensions 15 and 16 to the base.

It will be noted from Figures 2, 3, 4, and 5 that the bars 13 and 14 rest directly upon the base 22 along side the projections 20 and 21. Also the full strength of the side pieces of the frame is utilized in mounting the frame on the base. Yet there are no obstructions to interfere with the insertion of the picture in the frame before it is mounted on the base. The design of the base may be varied to suit the taste. Likewise the channel shaped frame can be decorated in any way desired. The most important feature of the device lies in providing the extensions of the side pieces beyond the frame for the mounting of the base, and the extensions on the base between the bars 13 and 14 for securing the picture in place.

For many purposes, it is not necessary to provide any locking means to hold the frame on the base since a relatively tight fit of the extensions in the openings 23 and 24 would be sufficient. However, I enlarge the openings 23 and 24 adjacent to the bottom of the base as indicated in Figures 4 and 5 at 25, and I provide two locking arms 26 and 27 in at least one of the openings 25. I then provide suitable notches at the ends of the extensions 15 and 16 to receive the arms 26 and 27. This locking mechanism can be readily released when the frame is inverted so that the base can be lifted and the picture in the frame can then be removed and replaced if desired.

It is believed that the foregoing description will make the nature and the advantages thereof sufficiently clear to enable the practice of it.

Having thus described my invention, I claim:

1. A frame for pictures and the like having a top piece and side pieces, all provided with channels facing inward to receive the top and side edges of the pictures, etc., two cross bars connecting the side pieces near, but short of, their lower ends, the cross bars being spaced apart in the direction perpendicular to the plane of the frame to permit insertion of pictures, etc., into the frame, and a base having openings therein removably receiving the portions of the side pieces that extend beyond the cross bars, and latch means concealed in the base for holding said portions in the openings, said base also having means projecting upwardly between the cross bars adjacent to the side pieces to hold the lower edge of a picture in position between the cross bars.

2. A frame for pictures and the like having a top piece and side pieces, all provided with channels facing inward to receive the top and side edges of the pictures, etc., two cross bars connecting the side pieces near, but short of, their lower ends, the cross bars being spaced apart in the direction perpendicular to the plane of the frame to permit insertion of pictures, etc., into the frame, and a base having openings therein removably receiving the portions of the side pieces that extend beyond the cross bars, and latch means concealed in the base for holding said portions in the openings, the latch means comprising an arm pivoted in the base and the extended portion of at least one side piece being notched to receive the arm.

WILLIAM A. HICKS.